United States Patent [19]

Minder

[11] 4,221,142
[45] Sep. 9, 1980

[54] TOOL CARRIER

[75] Inventor: Emile A. Minder, Vernier, Switzerland

[73] Assignee: Erhardt & Spiess, Werkzeug- und Maschinenbau GmbH & Co., Vaihingen, Fed. Rep. of Germany

[21] Appl. No.: 922,231

[22] Filed: Jul. 5, 1978

[30] Foreign Application Priority Data

Aug. 15, 1977 [CH] Switzerland ............... 9947/77

[51] Int. Cl.³ .................................. B23B 29/00
[52] U.S. Cl. ....................................... 82/36 R
[58] Field of Search .................. 82/36 R, 36 B, 37

[56] References Cited

U.S. PATENT DOCUMENTS

| | | | |
|---|---|---|---|
| 2,428,508 | 10/1947 | Weigle et al. | 82/36 R |
| 3,376,771 | 4/1968 | Barnes | 82/36 R |

FOREIGN PATENT DOCUMENTS

| | | | |
|---|---|---|---|
| 1042342 | 10/1958 | Fed. Rep. of Germany | 82/36 R |
| 1128256 | 4/1962 | Fed. Rep. of Germany | 82/36 R |
| 2345132 | 3/1975 | Fed. Rep. of Germany | 82/36 B |
| 1421676 | 11/1965 | France | 82/36 R |
| 243636 | 1/1947 | Switzerland | 82/37 |
| 258361 | 10/1949 | Switzerland | 82/37 |
| 317975 | 1/1957 | Switzerland | 82/37 |

*Primary Examiner*—Harrison L. Hinson
*Attorney, Agent, or Firm*—Young & Thompson

[57] ABSTRACT

The invention relates to a quick tightening tool carrier having a body intended to be fixed onto a machine tool and a support carrying a cutting tool. Both the body and the support have a flat surface provided with identical notchings and cooperating with one another. A collar made in two parts fixes the support onto the body. Each part of the collar is connected to one side of the support, and both parts surround the body and are connected to each other by means of a hinge comprising an excentric shaft, the angular positions of which determine the tightened or untightened position of the support on the body.

1 Claim, 3 Drawing Figures

TOOL CARRIER

The present invention has for its object a tool carrier which can be tightened quickly, for machine tools such as parallel lathes, turret lathes, copying machines, numerically controlled lathes, milling machines, chilling machines, surfacing machines with or without profile rectification and so on.

The aim of the present invention is to realize a tool carrier which is easy and cheap to manufacture, which is solid and of the universal type.

The tool carrier according to the present invention comprises a body, intended to be rigidly fastened onto a member of a machine tool by means of a fixing device, a tool carrier support and a quick tightening device permitting one to fix the support onto the body, characterized by the fact that the body has the general shape of a cylinder having a circular base and one side generally parallel to the longitudinal axis of the cylinder; by the fact that the generally parallel face of the body is provided with notches; by the fact that the support has a flat face provided with notches cooperating with the face of the body comprising the notches; by the fact that it comprises a tightening collar matching the body along its cylindrical portion and whose ends are connected in a removable manner to the body; this tightening collar being in two parts connected together by means of an excentric shaft the rotation of which controls the tightening of the support onto the body.

The attached drawings show schematically and by way of example an embodiment of the tool carrier according to the invention.

Figure 1:
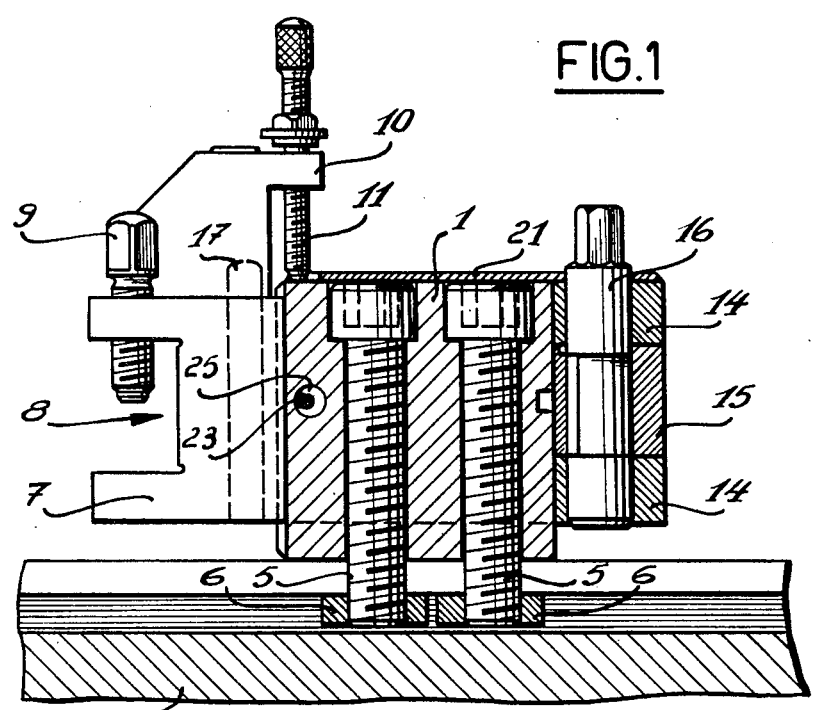
FIG. 1 is a cross section along line I—I of FIG. 2.
Figure 2:
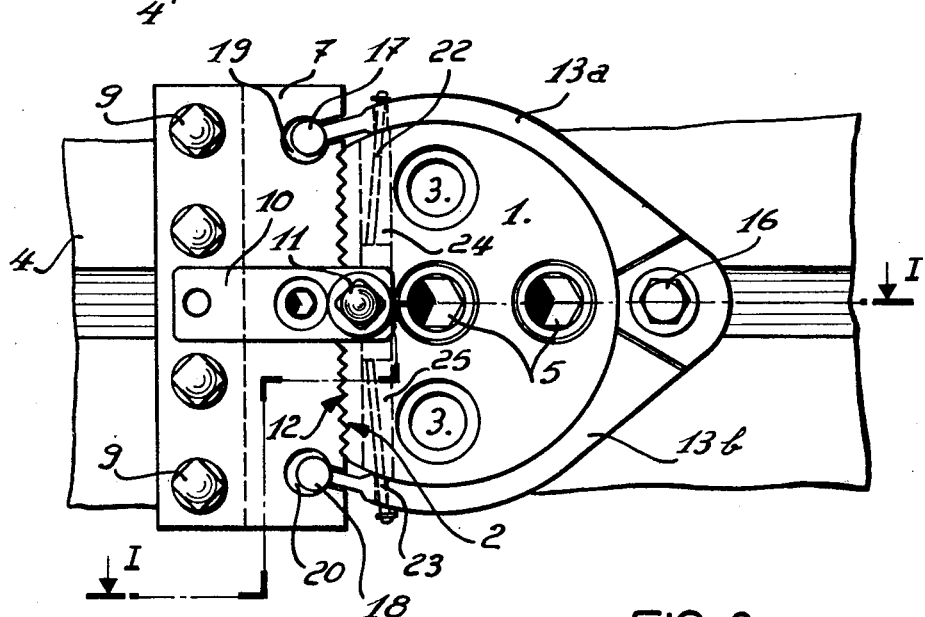
FIG. 2 is a top view.
Figure 3:
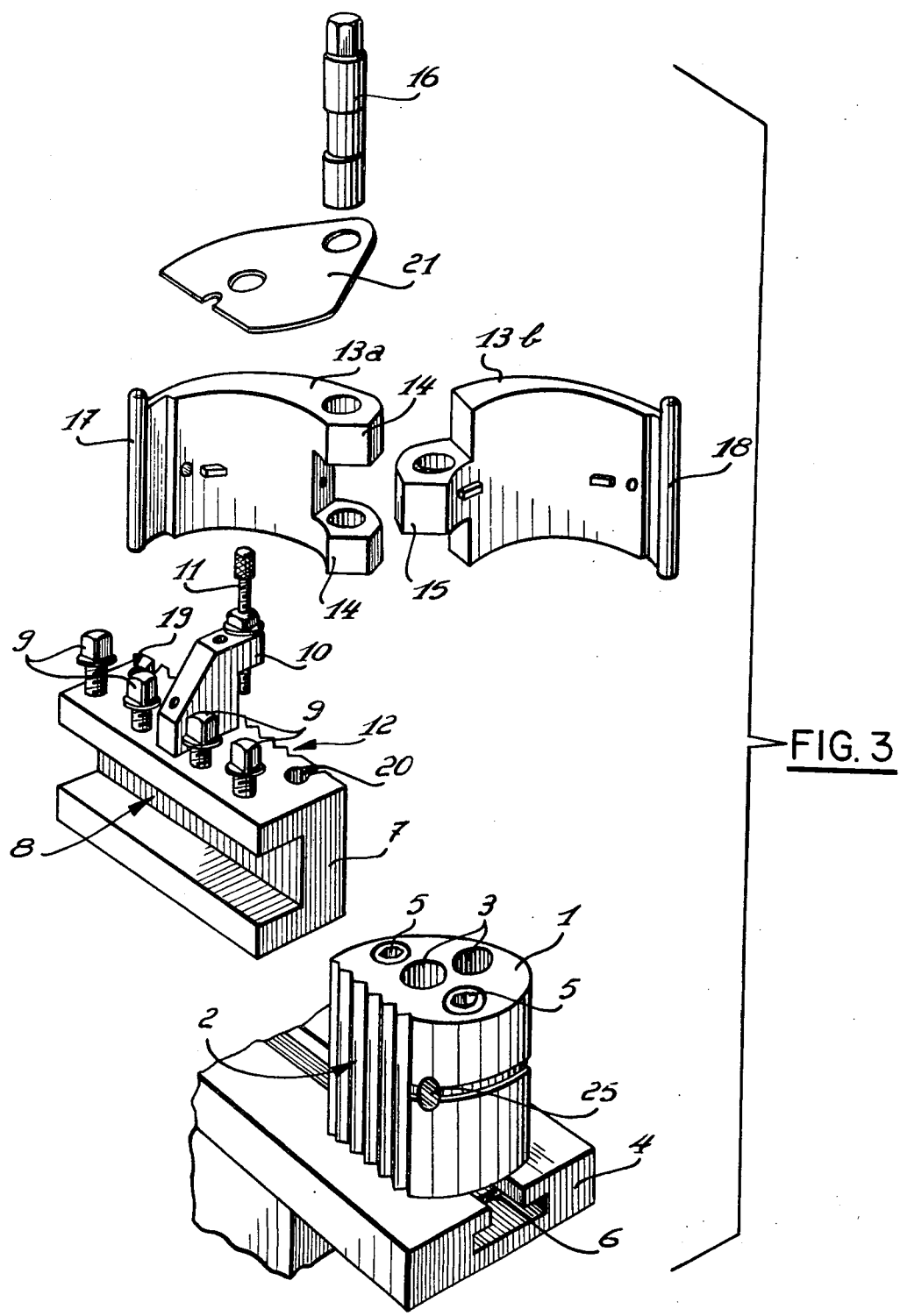
FIG. 3 is an exploded perspective view showing the constitutive parts of the tool carrier.

The tool carrier shown comprises a body 1 having the general shape of a cylinder which is provided with a notched face 2, parallel to the longitudinal axis of the body 1. This body 1 is pierced of four longitudinal bores 3 permitting to fix it onto a member of a machine tool 4 by means of bolts 5 and a threaded part 6 located in a T-shaped groove of the machine or fixed by means of a stud or screws on the flat surface of the machine.

The tool carrier comprises further a support 7 intended to receive cutting tools, a rod or any other tool or part to be machined, which may be fastened in a groove 8 by means of screws 9 in a well known manner. This support comprises a stirrup 10 carrying an adjusting screw 11 for its height. On its face, opposite the groove 8, this support comprises a notched face 12, the notches of which have exactly the same shape as those of the notched face 2 of the body and which is intended to be applied against said face 2.

The shape of the support may be different from the one illustrated, trapezoidal, triangular and so on, given by the shape of the tools or workpieces which have to be fixed.

A tightening device is provided to apply the support 7 against the body 1 to fix them together. This device comprises a tightening collar made in two parts 13a, 13b. These two parts 13a, 13b can be connected by means of a hinge formed by hasps 14 and a central excentric portion 15. Shaft 16 similarly has two concentric cylindrical end portions that rotate in hasps 14 and an excentric midportion that rotates in excentric portion 15. In this way a rotation of the shaft 16 causes the two parts of the collar 13a, 13b to come closer the one to the other or to away.

The free ends of the parts 13a, 13b of the collar have projecting cylindrical portions 17, 18 intended to cooperate with retaining means 19, 20 of the support 7 having a dove tail shape.

A protecting plate 21 may be provided.

When the cylindrical formations 17, 18 are engaged in the retaining means 19, 20, and the collar is in untightened position, it suffices to insert vertically this assembly onto the body 1, the faces 2 and 12 confronting one another. A quarter of a turn of the shaft 16 causes a quick and efficient tightening fixing rigidly the collar and the support onto the body.

This tool carrier permits one not only to change very quickly a cutting tool and provides the necessary rigidity of its fixing, but due to its design, it is cheaper because it is easy to manufacture. As a matter of fact, the notches are made on planar faces and not on cylindrical surfaces as was done until now in the known devices. Therefore only one and the same tooling permits one to produce the notches on both notched surfaces of the body and of the support, even for different sizes of tool carriers, that is for different diameters of the body 1.

Furthermore, as a given support can cooperate with bodies of different diameters according to the required rigidity for the intended machining operation, it is sufficient to choose a collar which is adapted to the body.

Thus a same support can be fixed onto bodies of different diameters. Furthermore, a support can be fixed on a body in two positions; the support can in fact be turned upside-down.

In the embodiment shown, the tool carrier comprises further an improvement, a device for maintaining the tightening collar on the body even when the support is withdrawn. This device comprises two spring rods 22, 23, fixed each on a portion 13a, 13b of the collar and extending in the bores 24, 25 respectively of the body 1. When the collar is untightened, the support can be removed by a vertical translation with respect to the body without removing the collar. A new support can be set in place and its tightening is effected very rapidly.

This tool carrier is particularly advantageous since it is very easy to adapt it to numerically controlled lathes provided with an automatic system for changing tools. In fact, the tightening and the untightening of the collar can be automatically controlled by means of the excentric and an automatic device can be provided to replace one support by another support provided with another tool.

What I claim is:

1. A tool carrier comprising a body to be rigidly fastened onto a member of a machine tool by means of a fixing device, a tool carrier support and a quick tightening device for fixing the support onto the body, said body having the general shape of a cylinder but having one side substantially flat and parallel to the longitudinal axis of the cylinder and having notches in said one side that extend parallel to the axis of the cylinder, said support having a substantially flat face having notches cooperating with said notches in said face of the body, a tightening collar matching the body along its cylindrical portion, means connecting the ends of the tightening collar in a removable manner to the body, said tightening collar being in two parts connected between themselves and by means of an eccentric shaft the rotation of which controls the tightening of the support on the body, and means for maintaining the collar on the body, in untightened position, even when the support is removed, said maintaining means comprising two spring rods one fixed on each part of the collar and extending into a bore in the body.

* * * * *